WILLIAM SOHIER.
Improvement in Fly-Nets.
No. 115,374. Patented May 30, 1871.
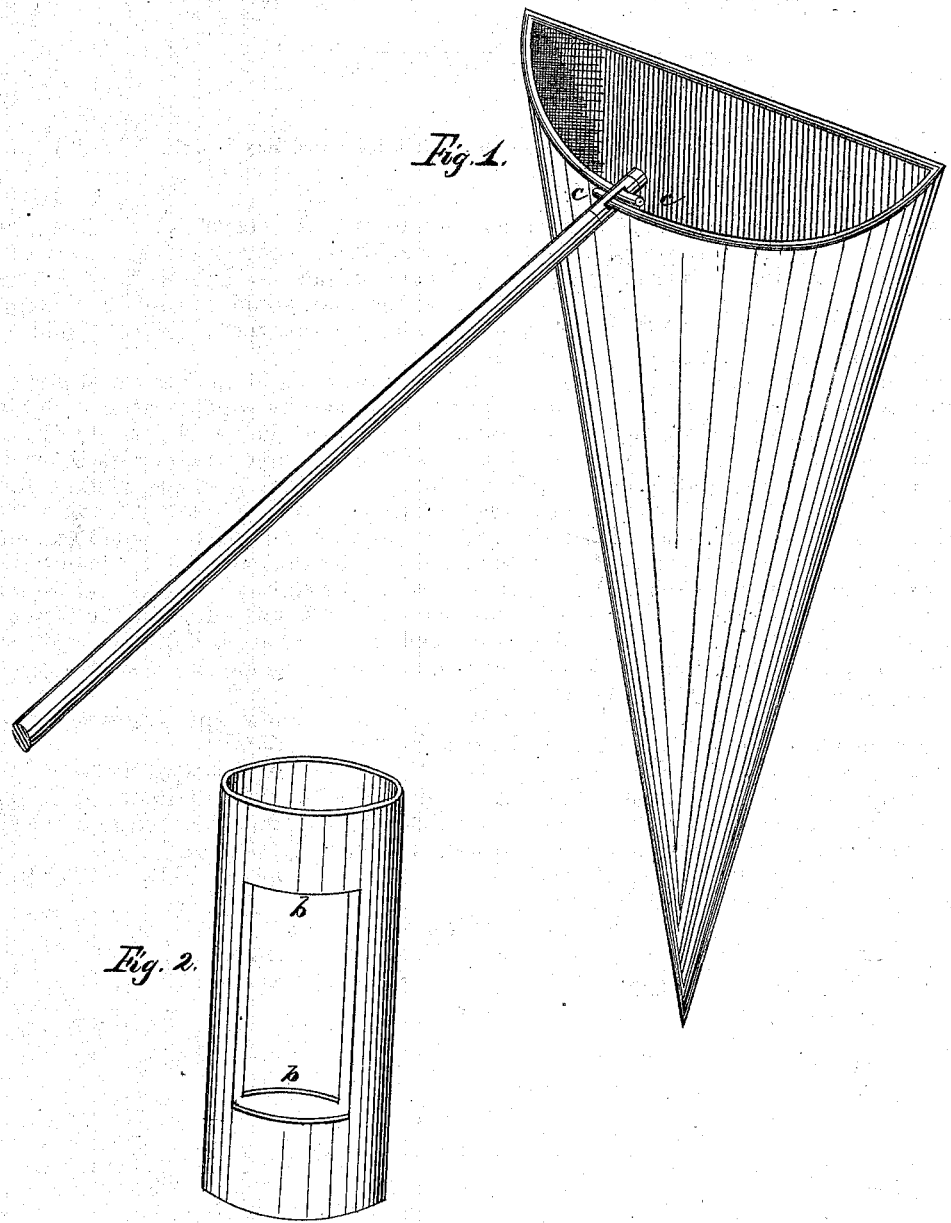
Witnesses.
Nath'l B Palmer
F. S. Williams
Inventor:
Wm Sohier

115,374

UNITED STATES PATENT OFFICE.

WILLIAM SOHIER, OF BOSTON, MASSACHUSETTS.

IMPROVEMENT IN FLY-NETS.

Specification forming part of Letters Patent No. 115,374, dated May 30, 1871.

I, WILLIAM SOHIER, of Boston, Massachusetts, have invented certain Improvements in Nets, of which the following is a specification:

*Nature and Objects of the Invention.*

My invention relates to a net to be used in ridding apartments, with slight trouble, and very expeditiously and effectively, of common house-flies, and avoiding by its use the many disgusting consequences of the various fly-poisons. It is called the "house-fly net."

Figure I represents the net, of a long and conical shape, with one side flattened, and my peculiar method of attaching the ends of the wire hoop. Fig. II represents the socket ready for the handle.

On the shape of the net and on the peculiar method of attaching the wire of the net to the handle depend the efficacy of the net and its durability.

In Fig. I it is seen that the net is long and conical, with the wire on one side straightened, so as to render that side of the net flat. The length and conical shape are adopted to prevent the fly, when captured, from escaping; and in this respect my net differs from a common entomological net, which is made large at the bottom to avoid injuring the captured insect. The straightening of the wire on one side allows the net to be swept close to the ceiling and into the corners of the room, by which the person using the net can secure a larger haul at each sweep, as well as arrest all fugitives that would, but for this, escape to a secure retreat where the net could not reach them.

In Fig. I, at $c\ c$, and in Fig. II, at $b\ b$, are shown the devices by which I secure the wire frame of my net to the handle in such a way that it will be firm, and run no risk of working loose, as all other methods which I have tried invariably do.

Fig. II represents a socket which fits onto the handle of the net; and $b\ b$ is a hole which traverses it, through which the ends of the wire hoop are to be passed, as in Fig. I, at $c\ c$. These ends may be flattened a little before insertion, and both should then be firmly soldered.

What I claim as new, and desire to secure by Letters Patent, is—

The above-described house-fly net, of a long and conical shape, with a flattened side, and a wire hoop at the top attached to a handle socket, substantially as described.

WM. SOHIER.

Witnesses:
    NATH. B. PALMER,
    F. S. WILLIAMS.